US010964184B2

(12) United States Patent
Entringer et al.

(10) Patent No.: US 10,964,184 B2
(45) Date of Patent: Mar. 30, 2021

(54) TAMPER DETECTION DEVICE

(71) Applicant: EM MICROELECTRONIC-MARIN SA, Marin (CH)

(72) Inventors: Christophe Entringer, Corcelles-pres-Concise (CH); Thomas Coulot, Vercel-Villedieu-le-Camp (FR); Fritz Mbumb-Kumb, Neuchatel (CH); Matteo Contaldo, Chavannes-pres-Renens (CH)

(73) Assignee: EM MICROELECTRONIC-MARIN SA, Marin (CH)

( * ) Notice: Subject to any disclaimer, the term of this patent is extended or adjusted under 35 U.S.C. 154(b) by 0 days.

(21) Appl. No.: 16/838,815

(22) Filed: Apr. 2, 2020

(65) Prior Publication Data
US 2020/0349821 A1 Nov. 5, 2020

(30) Foreign Application Priority Data
Apr. 30, 2019 (EP) .................................... 19171950

(51) Int. Cl.
*G08B 13/24* (2006.01)
*G08B 29/04* (2006.01)
*H01Q 1/06* (2006.01)

(52) U.S. Cl.
CPC ..... *G08B 13/2448* (2013.01); *G08B 13/2417* (2013.01); *G08B 13/2431* (2013.01); *G08B 13/2477* (2013.01); *G08B 29/046* (2013.01); *H01Q 1/06* (2013.01)

(58) Field of Classification Search
None
See application file for complete search history.

(56) References Cited

U.S. PATENT DOCUMENTS

| | | | | |
|---|---|---|---|---|
| 6,052,068 | A | 4/2000 | Price R-W et al. | |
| 6,304,185 | B1* | 10/2001 | Tuttle | A01M 1/026 340/10.1 |
| 7,109,867 | B2* | 9/2006 | Forster | G06K 19/07749 340/572.3 |
| 10,431,063 | B2* | 10/2019 | Colby | G06K 19/07709 |
| 10,452,844 | B2* | 10/2019 | Hall | G06F 21/81 |
| 2006/0001525 | A1* | 1/2006 | Nitzan | H01Q 9/16 340/10.1 |

(Continued)

FOREIGN PATENT DOCUMENTS

| | | |
|---|---|---|
| CN | 108427977 A | 8/2018 |
| EP | 1 949 346 A1 | 5/2007 |
| WO | 2018/234357 A1 | 12/2018 |

OTHER PUBLICATIONS

European Search Report for EP 19 17 1950 dated Aug. 22, 2019.

*Primary Examiner* — Chico A Foxx
(74) *Attorney, Agent, or Firm* — Sughrue Mion, PLLC

(57) ABSTRACT

An integrated circuit chip (2), an antenna (3) and a tamper loop (4), and in addition to this, a light emitting diode (LED) (20), configured to be activated, i.e. supplied with current, upon a signal received by the antenna (3). The LED (20) is integrated in the device in such a way that when the LED is activated in the above-described way, the LED lights up so as to become visible by the naked eye, on the condition that the tamper loop (4) is in a predefined state, either open or closed. The LED (20) is coupled between the same terminals (8,9) of the integrated circuit chip (2) as the tamper loop (4).

8 Claims, 2 Drawing Sheets

(56) References Cited

U.S. PATENT DOCUMENTS

| | | | | |
|---|---|---|---|---|
| 2007/0152829 A1* | 7/2007 | Lindsay | ............. | G06K 19/0717 |
| | | | | 340/572.3 |
| 2007/0252719 A1* | 11/2007 | Ray | ......................... | H04Q 9/00 |
| | | | | 340/679 |
| 2008/0007408 A1* | 1/2008 | Hwang | ................... | E05D 11/00 |
| | | | | 340/572.1 |
| 2008/0075934 A1* | 3/2008 | Barlow, Jr. | ............ | B65D 75/00 |
| | | | | 428/199 |
| 2009/0051562 A1* | 2/2009 | Potter | ............... | G08B 21/0286 |
| | | | | 340/693.5 |
| 2010/0039265 A1* | 2/2010 | Spivey, Jr. | ......... | G06K 19/0723 |
| | | | | 340/572.3 |
| 2011/0193678 A1* | 8/2011 | Hanft | ...................... | E05B 39/00 |
| | | | | 340/3.1 |
| 2012/0218110 A1* | 8/2012 | Forster | ............. | G06K 19/07749 |
| | | | | 340/572.1 |
| 2013/0033364 A1* | 2/2013 | Raz | ................. | G06K 19/07767 |
| | | | | 340/10.1 |
| 2013/0135104 A1* | 5/2013 | Nikkanen | ........ | G06K 19/07372 |
| | | | | 340/572.1 |
| 2013/0207783 A1* | 8/2013 | Cruzado | ................ | G06K 19/07 |
| | | | | 340/10.5 |
| 2015/0254961 A1* | 9/2015 | Brandl | ................ | G08B 21/185 |
| | | | | 340/663 |
| 2016/0126723 A1* | 5/2016 | Oyama | ............ | H03K 17/08122 |
| | | | | 361/91.2 |
| 2018/0040220 A1* | 2/2018 | Landauer | ......... | G06K 19/07798 |

* cited by examiner

TAMPER DETECTION DEVICE

CROSS REFERENCE TO RELATED APPLICATIONS

This application is a Non-Provisional application claiming priority on European Patent Application No. 19171950.9 filed Apr. 30, 2019.

FIELD OF THE INVENTION

The present invention is related to an electronic transponder device for use in conjunction with a product and aimed at detecting whether the product has been tampered with.

STATE OF THE ART

A well-known tamper detection device of the above-described type is realized as an RFID (Radio-Frequency Identification) transponder or 'tag'. Examples of such devices are described in documents US-A-2006/214789 and EP-A-3340114. The tag comprises an RFID integrated circuit chip, an antenna and a tamper loop. The integrated circuit chip is equipped with radio frequency circuitry for transmitting and receiving data from an RFID reader/transmitter, a memory for storing an identifier of a product and generally an identifier of the status of the tamper loop, tamper detection circuitry and power circuitry for providing power to the various components of the integrated circuit. The tag may be a passive tag, deriving power from the radio frequency signal itself, or an active tag provided with a power source such as a battery. The tamper loop is an electrically conductive connection that may be attached to a product, for example to the door of a container, in such a manner that unauthorized tampering causes the connection to be broken. The closed or open state of the loop is detected by the tamper detection circuitry of the tag and an identifier related to the state of the loop can be transmitted to the RFID reader.

The prior art device illustrated in FIG. 1 is realised as an RFID transponder comprising an integrated circuit chip 2 hereafter referred to an RFID chip 2, an antenna 3 and a tamper loop 4. The chip 2 and the antenna 3 are mounted on a carrier 5, which may be a printed circuit board. The chip 2, the antenna 3 and the loop 4 are shown schematically and are not drawn to scale. The tamper loop 4 is electrically coupled to two electrical conductors 6 and 7 fixed to or incorporated in the carrier 5. The conductors 6 and 7 are respectively connected to a first and second terminal 8 and 9 of the RFID chip 2. The antenna 3 is coupled between a third and fourth terminal 10 and 11 of the chip 2. Not all the building blocks of the RFID chip 2 are shown in detail. In particular, RF circuitry and power supply circuitry, as well as any memory and memory access circuitry are not shown, as these building blocks are well-known in the art. The tamper detection circuitry comprises a tamper control and read-out circuit 15 coupled to the first terminal 8 via a conductor 16 that is itself coupled to a supply voltage Vsup generated by the power supply circuitry of the chip, via a first resistor R1 and a first switch S1, preferably realized as a CMOS transistor. The second terminal 9 is coupled to a reference voltage Vref (preferably ground) via a conductor 17, a second resistor R2 and a second switch S2. Closing the switches S1 and S2 simultaneously activates the tamper detection. The opening or closing of the switches S1 and S2 is operated on the basis of command signals transmitted to the chip 2, and transferred to the switches by the tamper control and-read out circuit 15 through conductors and 19. With the switches S1 and 2 closed, the tamper detection takes place by verifying the status of the tamper loop 4. When the tamper loop 4 is closed (non-tampered condition), the voltage difference between the first and second terminal 8 and 9 is low. When the loop is broken (tampered condition), the voltage difference is high. This voltage difference is detected by the tamper control and read-out circuit 15 and translated into a signal that may be transmitted via the antenna 3 to an RFID reader, thereby communicating the status 'open' or 'closed' of the tamper loop. Any details of the above-described components may be realized in accordance with known devices or their equivalents. The resistors R1 and R2 may for example be replaced by current sources.

One shortcoming of the existing transponders is that the verification of the state of the tamper loops of a plurality of tags requires the interrogation of each of the tags, which may be time-consuming and unpractical.

SUMMARY OF THE INVENTION

The invention aims to provide a tamper detection device that resolves the above-described shortcoming of existing devices. This aim is achieved by a device in accordance with the appended claims. A device according to the invention comprises the same components as existing devices, namely an integrated circuit chip, an antenna and a tamper loop, and in addition to this, the device comprises a light emitting diode (LED), configured to be activated, i.e. supplied with current, upon a signal received by the antenna. The LED is integrated in the device in such a way that when the LED is activated in the above-described way, the LED lights up so as to become visible by the naked eye, on the condition that the tamper loop is in a predefined state, either open or closed. The LED is coupled between the same terminals of the integrated circuit chip as the tamper loop.

The detection device of the invention thereby allows a quick visual inspection of the status of the tamper loop of one or more products equipped with the device.

DETAILED DESCRIPTION OF PREFERRED EMBODIMENTS OF THE INVENTION

Figure 1:
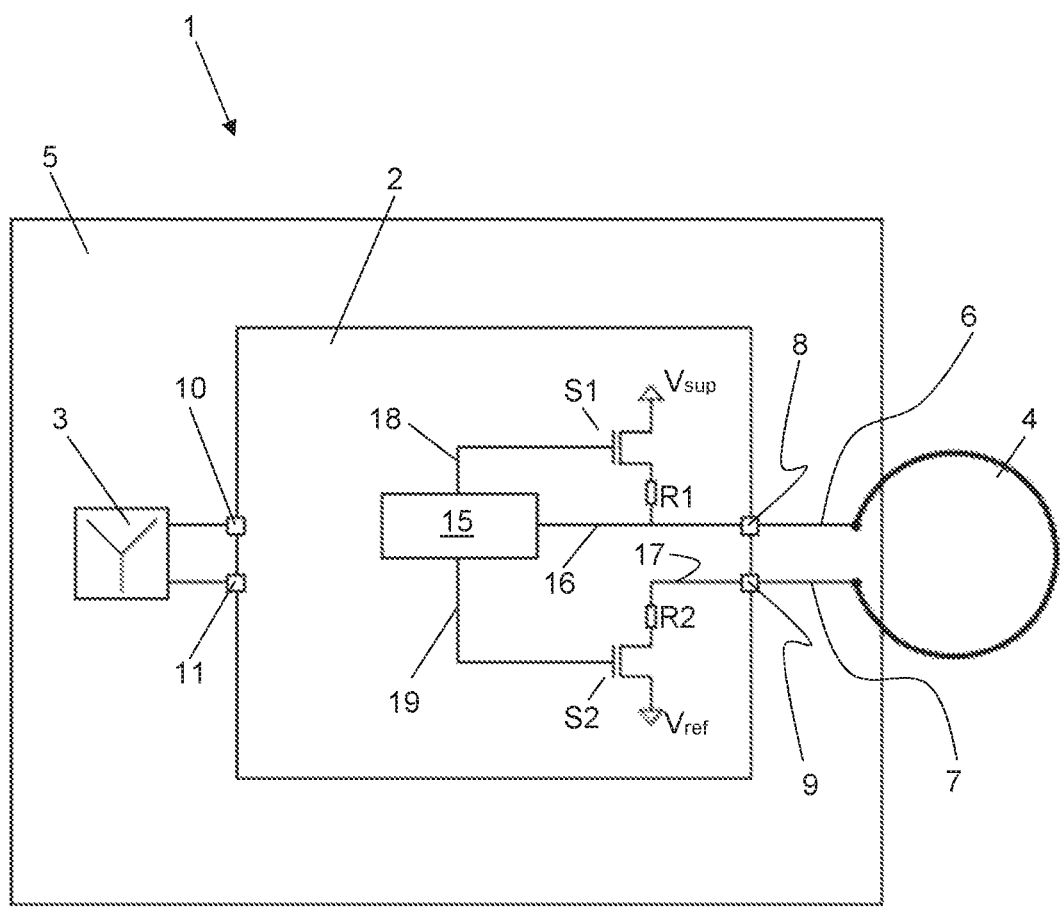
FIG. 1 illustrates a tamper detection device known in the prior art.
Figure 2:
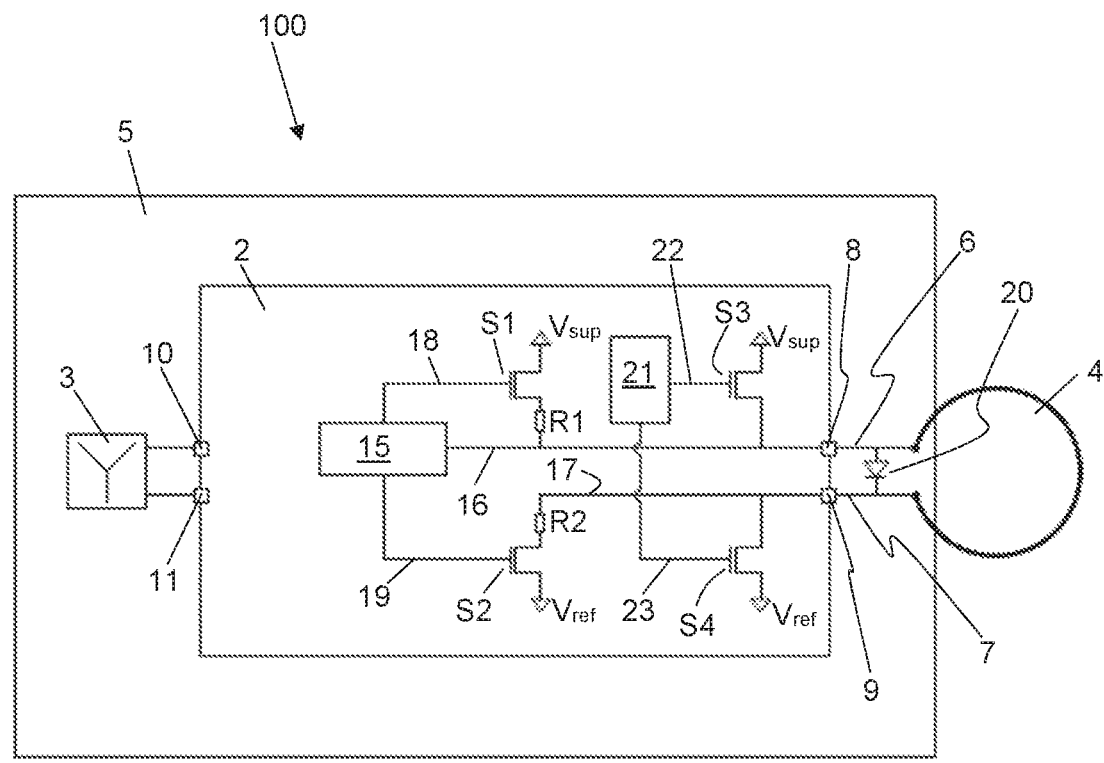
FIG. 2 illustrates a tamper detection device according to a first embodiment of the invention.

FIG. 2 shows an RFID tag 100 in accordance with a first embodiment of the invention. The device comprises all of the above-described components, which are indicated by the same reference numerals used above in relation to FIG. 1. The RFID tag 100 comprises an integrated circuit chip 2 hereafter referred to an RFID chip 2, an antenna 3 and a tamper loop 4. The chip 2 and the antenna 3 are mounted on a carrier 5, which may be a printed circuit board. The chip 2, the antenna 3 and the loop 4 are shown schematically and are not drawn to scale. The tamper loop 4 is electrically coupled to two electrical conductors 6 and 7 fixed to or incorporated in the carrier 5. The conductors 6 and 7 are respectively connected to a first and second terminal 8 and 9 of the RFID chip 2. The antenna 3 is coupled between a third and fourth terminal 10 and 11 of the chip 2. The tamper detection circuitry comprises a tamper control and read-out circuit 15 coupled to the first terminal 8 via a conductor 16 that is itself coupled to a supply voltage Vsup generated by the power supply circuitry of the chip, via a first resistor R1 and a first switch S1, preferably realized as a CMOS transistor. The second terminal 9 is coupled to a reference voltage Vref (preferably ground) via a conductor 17, a second resistor R2 and a second switch S2. Closing the switches S1 and S2 simultaneously activates the tamper detection. The opening or closing of the switches S1 and S2 is operated on the basis of command signals transmitted to the chip 2, and transferred to the switches by the tamper control and-read out circuit 15 through conductors 18 and 19. With the switches S1 and S2 closed, the tamper detection takes place by verifying the status of the tamper loop 4. Also and in the same way as described in relation to FIG. 1, the RFID chip comprises a number of components not shown in the drawing but well known in the art, such as RF circuitry, power supply circuitry, electronic memory and memory access circuitry. All components may be realized in accordance with known devices or their equivalents.

In addition to this, a LED (light emitting diode) 20 is mounted on the carrier 5. The LED 20 is coupled between the first and second terminal 8 and 9 and parallel with the tamper loop 4. The RFID chip 2 comprises circuitry for supplying current to the LED 20 in accordance with a command signal sent from an RFID transmitter. This circuitry comprises a LED control circuit 21 coupled to the RF circuitry of the chip 2, and a third and fourth switch S3 and S4. The third switch S3 is coupled between the supply voltage $V_{sup}$ and the conductor 16 that is also coupled to the tamper control and read-out circuit 15, i.e. the third switch S3 is coupled in parallel with the first switch S1. The fourth switch S4 is coupled between the conductor 17 and the reference voltage $V_{ref}$, i.e. the fourth switch S4 is coupled parallel to the second switch S2. The LED control circuit 21 is configured to open or close both switches S3 and S4 simultaneously, through conductors 22 and 23, upon a command received by the antenna 3 and transmitted through the RF circuitry of the chip 2.

When both switches S3 and S4 are closed and when the tamper loop 4 is broken, the current flowing through the diode 20 is sufficient to light the diode so that it becomes visible with the naked eye. However, when the tamper loop 4 is closed, the loop 4 bypasses the LED 20, so that the LED fails to light up even though the switches S3 and S4 are closed. When multiple products are equipped with a device according to FIG. 2, the closing of the switches S3 and S4 in all of the devices will result in the LEDs 20 becoming visible on all products which have been tampered with. This allows a quick visual verification of tampered products.

When the switches S3 and S4 are open, i.e. the LED 20 is de-activated, tamper detection takes place in the same way as described above in relation to the device shown in FIG. 1. In this case, when the tamper loop 4 is closed, current flows through the loop 4 and not through the LED 20, so that the low tamper voltage indicates that the loop is closed. When the loop 4 is broken, the current flowing through the LED 20 is low enough so that the LED 20 voltage is high.

Figure 3:
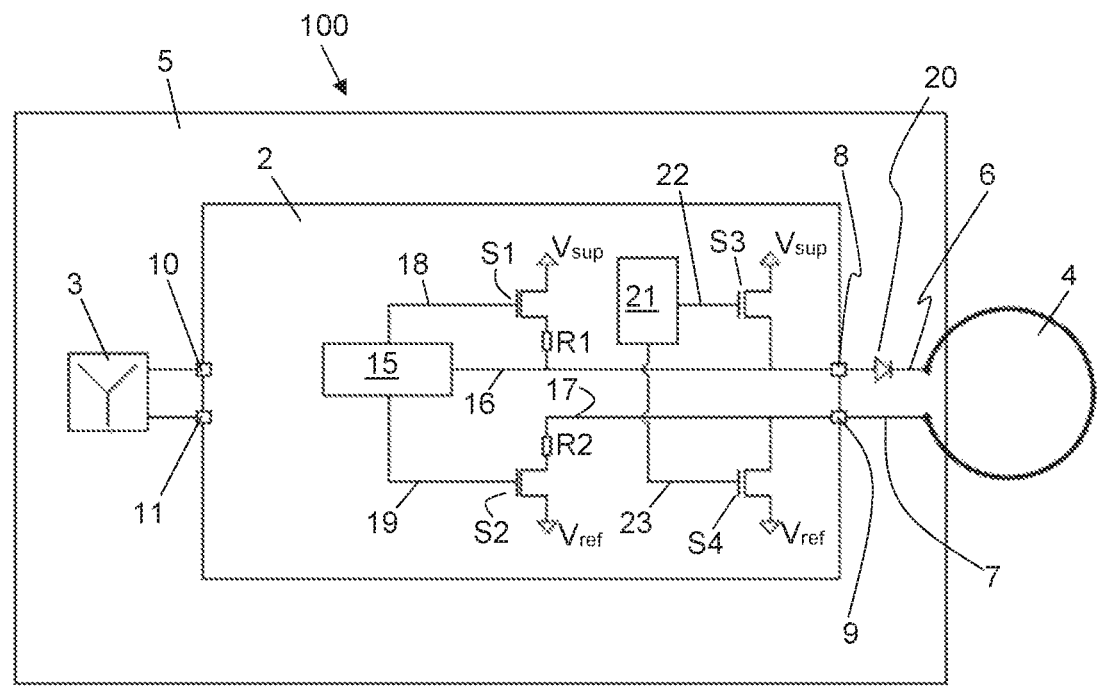
FIG. 3 illustrates a tamper detection device according to a second embodiment of the invention.

FIG. 3 shows a second embodiment of an RFID tag 100 in accordance with the invention. In this case, the diode 20 is coupled in series with the tamper loop 4. This device operates in the same way as the device of FIG. 2, except that the activation of the LED 20 by closing switches S3 and S4 leads to lighting of the LED on condition that the tamper loop 4 is closed. In other words, the device allows to visually indicate all products which have not been tampered with.

In both of the embodiments shown in FIGS. 2 and 3, the LED 20 is coupled to the same terminals 8 and 9 to which the tamper loop 4 is connected. The invention therefore does not require additional terminals on the chip 4.

While the invention has been illustrated and described in detail in the drawings and foregoing description, such illustration and description are to be considered illustrative or exemplary and not restrictive. Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A tamper detection device comprising an integrated circuit (IC) chip comprising a first terminal, a second terminal, a third terminal and a fourth terminal, the device further comprising an antenna and a tamper loop which may be in an open or closed state, wherein the tamper loop is coupled between the first terminal and the second terminal of the IC chip, and the antenna is coupled between the third terminal and the fourth terminal of the IC chip, and wherein the IC chip comprises power supply circuitry, wireless communication circuitry for receiving and sending signals through the antenna, and tamper detection circuitry for detecting the status of the tamper loop,
  wherein:
    the device further comprises a light emitting diode coupled also between the first terminal and the second terminal, and
    the IC chip comprises circuitry for activating or deactivating the supply of current to the diode, following a command signal received by the antenna,
    the device is configured so that:
      a signal transmitted to the device effective to activate the supply of current to the diode causes the diode to be lit when the tamper loop is in a predefined state,
      said signal fails to light the diode, when the tamper loop is in the state opposite to the predefined state.

2. The device according to claim 1, wherein the LED is coupled in parallel with the tamper loop, so that the signal causes the diode to be lit when the tamper loop is open.

3. The device according to claim 1, wherein the LED is coupled in series with the tamper loop, so that the signal causes the diode to be lit when the tamper loop is closed.

4. The device according to claim 1, wherein:
  the tamper detection circuitry comprises a tamper control and read-out circuit and a first and second switch and wherein:
    the tamper control and read-out circuit is connected to the first terminal via a first conductor,
    the first switch is coupled between on the one hand a supply voltage generated by the power supply circuitry, and on the other hand the first conductor,
    the second switch is coupled between the second terminal and a reference voltage, with respect to which the supply voltage is generated,
    the tamper control and read-out circuit is configured to be able to open or close the first and second switch simultaneously, and to read the status of the tamper loop when both switches are closed, the circuitry for activating or deactivating the supply of current to the diode comprises a LED control circuit, a third switch and a fourth switch, wherein
the third switch is coupled in parallel with the first switch,
the fourth switch is coupled in parallel with the second switch,
the LED control circuit is configured to be able to open or close third and fourth switches simultaneously.

5. The device according to claim 4, wherein a first and second resistor are respectively coupled in series with the first and second switch.

6. The device according to claim 1, wherein the integrated circuit chip is an RFID (Radio Frequency Identification) chip.

7. The device according to claim 1, wherein the device comprises a carrier, and wherein the IC chip, the antenna and the LED are mounted on the carrier.

8. The device according to claim 7, wherein the carrier is a printed circuit board.

* * * * *